United States Patent
Wang et al.

(10) Patent No.: US 6,668,376 B1
(45) Date of Patent: Dec. 23, 2003

(54) SYSTEM AND METHOD FOR AUTOMATICALLY LOADING A DEVICE DRIVER

(75) Inventors: Wayne Wang, Cupertino, CA (US); Jayasimha Nuggehalli, Union City, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/478,790

(22) Filed: Jan. 7, 2000

(51) Int. Cl.[7] .............................. G06F 9/445; G06F 3/00
(52) U.S. Cl. ........................................... 717/178; 710/8
(58) Field of Search ................................. 717/168–178; 709/200–222; 710/8–14; 707/100–102

(56) References Cited

U.S. PATENT DOCUMENTS

| | | | | |
|---|---|---|---|---|
| 5,968,136 A | * | 10/1999 | Saulpaugh et al. | 717/178 |
| 6,003,097 A | * | 12/1999 | Richman et al. | 710/11 |
| 6,009,480 A | * | 12/1999 | Pleso | 710/14 |
| 6,151,643 A | * | 11/2000 | Cheng et al. | 709/200 |
| 6,377,986 B1 | * | 4/2002 | Philyaw et al. | 709/219 |

OTHER PUBLICATIONS

Araki et al. A Non–Stop Updating Technique For Device Driver Programs On the IROS Platform. IEEE. 1995. pp. 88–92.*

Symborski. Updating Software And Configuring Data in A Distributed Communications Network. IEEE. 1988. pp. 331–338.*

* cited by examiner

*Primary Examiner*—Wei Zhen
(74) *Attorney, Agent, or Firm*—Oblon, Spivak, McClelland, Maier & Neustadt, P.C.

(57) ABSTRACT

A system and method in which device driver software for a peripheral device to be attached to a computer is automatically downloaded from a designated world wide web (WWW) site of the manufacturer of the peripheral device. The device driver is automatically installed in a computer, the device driver driving a peripheral device connected to the computer. As a first operation, the peripheral device provides unique identification data to the computer. The computer then obtains a URL address, which the manufacturer of the peripheral device previously set up to contain the device driver corresponding to the peripheral device, based on the obtained identification data from the peripheral device. Then, the obtained URL address containing the device driver for the peripheral device is accessed. The device driver is then downloaded from the accessed URL address and installed in the computer. With such an operation, the computer automatically installs the device driver corresponding to the peripheral device by accessing the previously established URL address containing the device driver for the peripheral device.

9 Claims, 4 Drawing Sheets

| 41 | 42 | 43 |
|---|---|---|
| MANUFACTURER | COMMAND SET | MODEL |

*FIG. 4A*

| 41 | 42 | 43 | 44 | 45 | 46 |
|---|---|---|---|---|---|
| MANUFACTURER | COMMAND SET | MODEL | CLASS | DESCRIPTION | COMPATIBLE ID |

*FIG. 4B*

| 41 | 42 | 43 | 44 | 45 | 46 | 49 |
|---|---|---|---|---|---|---|
| MANUFACTURER | COMMAND SET | MODEL | CLASS | DESCRIPTION | COMPATIBLE ID | URL ADDRESS |

*FIG. 5*

SYSTEM AND METHOD FOR AUTOMATICALLY LOADING A DEVICE DRIVER

BACKGROUND OF THE INVENTION

1. Field of the Invention

The present invention is directed to a system and method which automatically locates and loads a device driver in a computer for a peripheral device attached to the computer.

2. Discussion of the Background

Computer users often purchase peripheral devices to be attached to their computers. Common examples of such peripheral devices are a printer, a CD writer, scanner, network interface cards, display cards, etc. FIG. 1 shows a computer 1 with a peripheral device 2 attached thereto. The peripheral device 2 is also accompanied by software 3 to be installed in the computer 1. The software 3 includes a device driver so that the computer 1 can properly drive and operate the peripheral device 2. The device driver software 3 is typically stored on a floppy disk, CD-ROM, etc. packaged with the peripheral device 2 and which the computer user installs into a floppy disk drive, CD-ROM drive, etc. of the computer 1. After installation of the device driver software 3 the computer 1 will include the device driver embedded in its operating system for driving the peripheral device 2.

The background system of including a device driver on software 3 packaged with the peripheral device 2 results in certain problems for both the computer user and the manufacturer of the peripheral device 2.

First, with the background system shown in FIG. 1 the computer user is required to install the device driver software 3. In that case, there is always the possibility that the computer user will perform an improper operation in installing the device driver software 3. That may particularly be the case if the device driver software 3 includes device drivers for several different peripheral devices and/or if the computer user is required to make certain selections or settings during installing the device driver software 3, which can increase the chance of the computer user making errors in installing the device driver software 3.

Moreover, from the vantage point of the manufacturer of the peripheral device 2, requiring to package the device driver software 3 with each peripheral device 2 has the obvious drawback of increasing costs. Moreover, it often occurs that errors in device drivers are discovered or device drivers are updated after they have been shipped with peripheral devices. In that instance, the device driver software 3 provided with the peripheral device 2 may not be the most up-to-date version of the device driver or may contain minor flaws or bugs, which is also obviously problematic for the computer user.

One manner of addressing the problem of the device driver software 3 containing bugs or flaws or not being the most up-to-date version is to make device driver software available on a web site of the manufacturer of the peripheral device 2. In that instance, the computer user can access that web site and download the updated device driver software. However, that operation requires the computer user to properly access the designated web site and to select the appropriate device driver software from the web site. Such actions are not only time consuming on the part of the computer user but also open up the possibility of the computer user making errors in downloading the device driver software.

SUMMARY OF THE INVENTION

Accordingly, one object of the present invention is to provide a novel system and method for loading in a computer a device driver for a peripheral device which overcomes the above-noted and other drawbacks in the background art.

Another and more specific object of the present invention is to provide a novel system and method for loading in a computer a device driver for a peripheral device which requires minimum actions on the part of the computer user.

Another and more specific object of the present invention is to provide a novel system and method for loading in a computer a device driver for a peripheral device which obviates the need for device driver software to be packaged with the peripheral device.

The present invention achieves the above and other objects by providing a novel system and method in which device driver software for a peripheral device to be attached to or loaded in a computer is automatically downloaded from a designated world wide web (WWW) site of the manufacturer of the peripheral device to the computer. The computer then installs the downloaded device driver.

More specifically, in the system and method of the present invention a device driver is automatically installed in a computer, the device driver driving a peripheral device connected to the computer. As a first operation in the present invention, the peripheral device provides unique identification data to the computer to which it is connected. The computer then obtains a URL address, which the manufacturer of the peripheral device previously set up to contain the device driver corresponding to the peripheral device, based on the obtained identification data from the peripheral device. Then, the obtained URL address containing the device driver for the peripheral device is accessed. The device driver is then downloaded from the accessed URL address and installed in the computer. With such an operation, the computer automatically installs the device driver corresponding to the peripheral device by accessing the previously established URL address containing the device driver for the peripheral device.

The present invention can employ one of two methods of obtaining the URL address based on the obtained identification data from the peripheral device. A first manner is that the peripheral device itself provides the URL address data within its identification data provided to the computer. A second possibility is that the computer contains a database at least correlating different identification data to URL addresses.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 4(A) and 4(B) show different forms that identification data provided from a peripheral device can take in the present invention; and FIG. 5 shows a further structure that identification data provided from a peripheral device can take in a further embodiment of the present invention.

DESCRIPTION OF THE PREFERRED EMBODIMENTS

Figure 2:
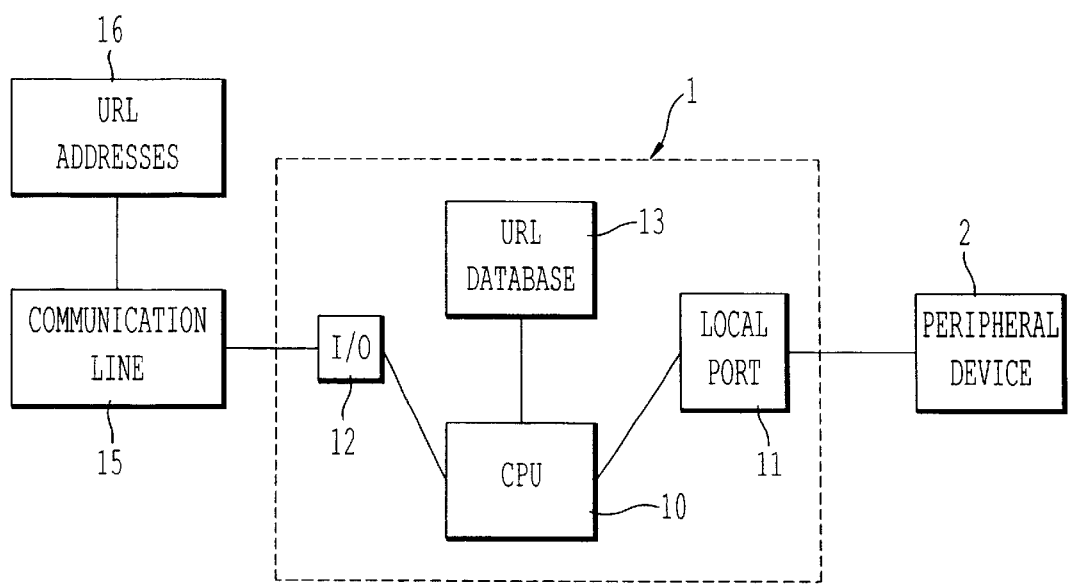
FIG. 2 shows a system of the present invention.

Referring now to the drawings, wherein like reference numerals designate identical or corresponding parts throughout the several views, and more particularly to FIG. 2 thereof, a system of the present invention is shown.

The present invention is directed to a system and method which can automatically install in a computer a device driver for a peripheral device attached to the computer.

The present invention achieves the above-noted and other operations by the peripheral device providing unique identification data to the computer to which it is attached. The peripheral device does not come packaged with any software, e.g. does not come with a floppy disk, containing a device driver for that peripheral device. Instead, in the system of the present invention the manufacturer of the peripheral device has the device driver stored at a designated uniform resource locator (URL) address on its world wide web (WWW) site.

The computer takes the unique identification data provided from the peripheral device and corresponds that identification data to the specific previously designated URL address containing the device driver for that peripheral device. The computer then accesses the URL address containing the device driver for the peripheral device, downloads the device driver from the particular URL address, and then installs the downloaded device driver. Such operations are done automatically by the computer system so that the computer user does not have to take actions to install the device driver, or the computer user may only have minimum actions to take to install the device driver. Further, the benefit provided to the manufacturer of the peripheral device is that that manufacturer does not have to package device driver software with the peripheral device, and the computer user will have loaded the most up-to-date version of the device driver for that peripheral device.

Attention is directed to FIG. 2 to explain the system and method of the present invention in further detail.

FIG. 2 shows the computer 1 of the present invention attached to a peripheral device 2. The computer 1 includes a CPU 10 which controls the operations of the computer 1. The CPU 10 is connected to the peripheral device 2 by a local port 11. Further, the CPU 10 is connected to a communication line 15 by an input/output (I/O) device 12. The communication line 15 may be any type of line permitting communication from the computer 1 to the world wide web. The most typical form of the communication line 15 is a standard telephone line. However, the communication line 15 could also clearly be a wireless connection, a coaxial line in an instance in which the I/O device 12 includes a cable modem, a T1 line, a local area network (LAN), DSL, etc. Further, through the I/O device 12 and the communication line 15 the CPU 10 acts to access various URL addresses 16. The URL addresses 16 are different web sites which can be accessed and which contain device drivers which can be downloaded to the computer 1.

Figure 1:
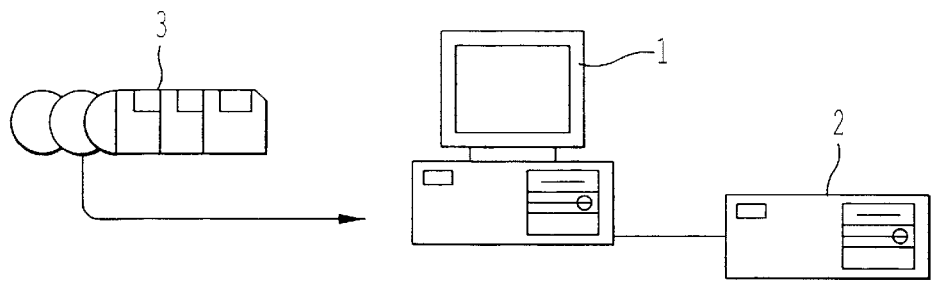
FIG. 1 shows a background art system.

The computer 1 also includes a URL database 13, shown in FIG. 1 as a part of the computer 1, but which can also be an external database. The URL database 13 correlates peripheral device identification data received from the peripheral device 2 to specific URL addresses in any known manner. The URL database 13 is previously generated with the help of manufacturers of peripheral devices; that is, the manufacturers of the peripheral devices have to provide a specific URL address containing a device driver in correlation with particular identification data provided from a peripheral device. There are three distinct types of URLs: absolute, relative, and local. There are also a few special-case URLs supported by some browsers. Absolute URLs completely describe how to obtain a file on the Internet, and thus the URL database 13 can preferably store absolute URL addresses.

Figure 3:
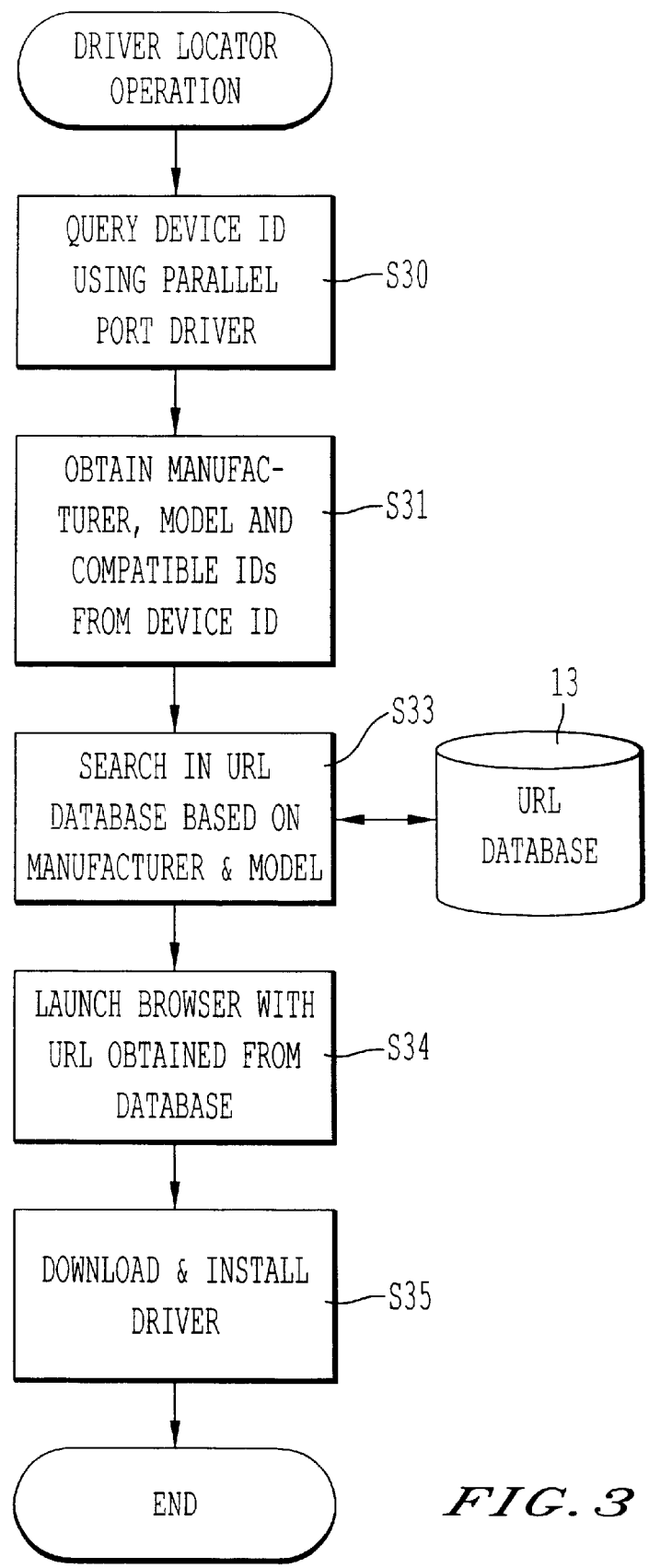
FIG. 3 shows an operation executed in the system of the present invention.

The operation of the system of FIG. 2 is shown in FIG. 3. As shown in FIG. 3, in a first step S30 the computer 1 queries the peripheral device 2 for its device identification (ID) utilizing a driver in the local port 11. This query can be taken by the computer 1 after the computer 1 recognizes that the peripheral device 2 has been attached thereto, by prompting from a computer user, or by any other manner. Then, the operation proceeds to step S31 during which the peripheral device 2 provides its unique identification data to the computer 1. That identification data provided from the peripheral device 2 to the computer 1 may include data of the manufacturer of the peripheral device 2, the command set, indicating commands understood by the peripheral device 2, and the model of the peripheral device 2. In the instance that the peripheral device 2 is a printer, the command set is a printer description language (PDL) which is understood by the printer, such as printer job language (PJL), printer control language (PCL), PCLXL, etc. It will be typical that the information data provided from the peripheral device 2 is strings composed of ASCII values between 32–127 (20h-7Fh), inclusive.

In the instance that the peripheral device 2 is a printer, the minimum requirements for the identification data provided from the peripheral device 2 can be as those described in section 6.6 of the IEEE 1284 specification, the entire contents of which are incorporated herein by reference. Specifically, as shown in FIG. 4(A) that identification data can include key values for the MANUFACTURER 41, COMMAND SET 42, and MODEL 43. In the instance that the peripheral device 2 is not a printer, other protocol and command set data can be exchanged.

However, in a preferred embodiment, and as shown in FIG. 4(B), the identification data provided from the peripheral device 2 may include the additional key words of CLASS 44, DESCRIPTION 45, and COMPATIBLE ID 46. The key value CLASS 44 may, as an example, take any of the following values: PRINTER, MODEM, NET, HDC, PCMCIA, MEDIA, FDC, PORTS, SCANNER, DIGCAN. The key value DESCRIPTION 45 may be an ASCII string that provides a description of the device the manufacturer would like presented to the computer user if a MICROSOFT WINDOWS INF file is not found. That is, an INF file is a MICROSOFT WINDOWS information file which includes information for installation of a peripheral device, including plug-and play type information. The key value DESCRIPTION 45 includes similar data as in such a MICROSOFT WINDOWS INF file and is provided in case the MICROSOFT WINDOWS INF file cannot be found. The DESCRIPTION 45 key should be no longer than 128 characters. The key value COMPATIBLE ID 46 may have any value that exactly matches an ID value listed in an INF file.

The key values of MANUFACTURER 41, MODEL 43, and COMPATIBLE ID 46 are key values which preferably remain static for any device. The MANUFACTURER 41 and MODEL key 43 values should remain unique for each manufacturer.

After the operation in step S31, the operation then proceeds to step S33. In step S33 the computer 1 accesses the URL database 13, based on the identification data provided from the peripheral device 2 and finds a URL address corresponding to the provided identification data. After the appropriate URL address is obtained in step S33 based on the identification data provided from the peripheral device, the operation then proceeds to step S34. In step S34 the computer 1 launches its browser, for example Microsoft Internet Explorer, Netscape Navigator, etc., with the URL address obtained from the URL database 13. Thus, in step S34 the computer 1 accesses one of the URL addresses 16 through the communication line 15. When the computer 1 has connected to the designated URL address, the computer system 1 then, in step S35, automatically downloads and installs the device driver from the designated URL address into the computer 1.

The operation is then completed.

In the embodiment noted above the CPU 10 finds the URL address based on the provided identification data from the peripheral device 2 by accessing the URL database 13. That URL database 13 need not be provided as a part of the computer 1, but could also be stored on a web page which the computer 1 initially accesses, as an example.

The operation of the present invention as discussed above relies on the computer 1 including the URL database 13 to correspond the identification data provided from the peripheral device 2 to an appropriate URL address. However, in a further embodiment of the present invention such a URL database 13 may be unnecessary.

More particularly, FIG. 5 shows a further form which the identification data provided from the peripheral device 2 can take. In that further form shown in FIG. 5 the peripheral device 2 itself provides to the computer 1 URL ADDRESS data 49 indicating the URL address at which its device driver is stored. That is, as shown in FIG. 5 the identification data provided from the peripheral device 2 also includes the key value URL ADDRESS 49. In such an operation, the peripheral device 2 itself provides the computer 1 with the URL address which has the device driver for the peripheral device 2.

Figure 6:
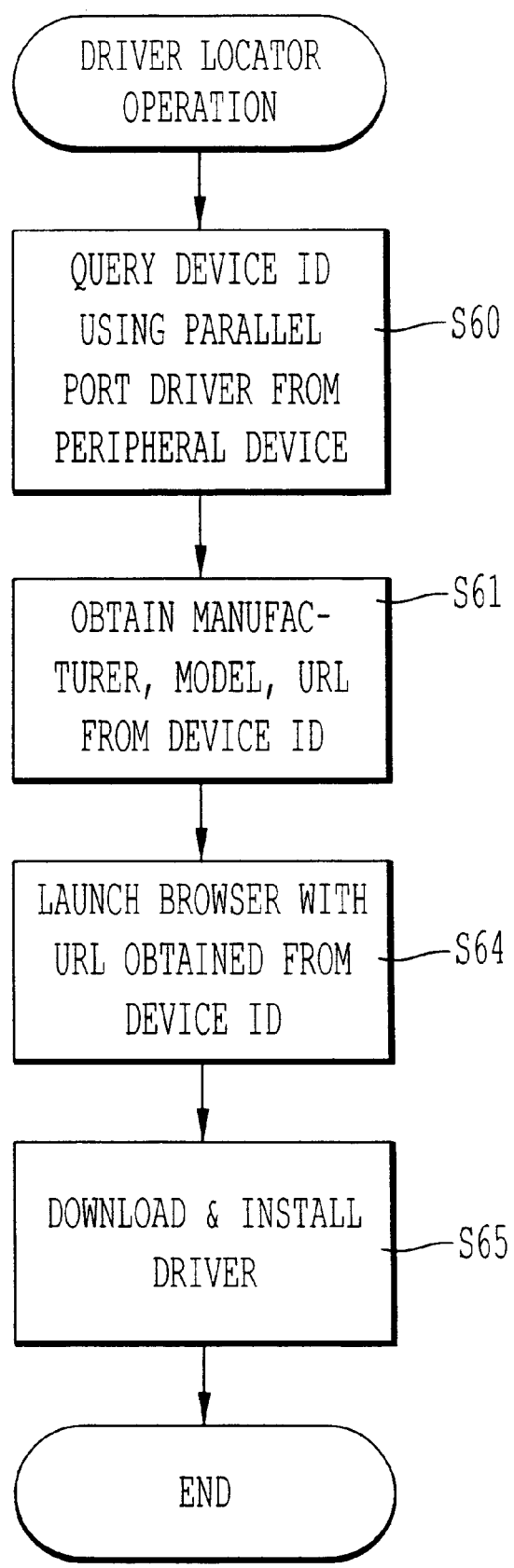
FIG. 6 shows an operation executed in the further embodiment of the present invention.

In such a situation in which the identification data provided from the peripheral device 2 is as shown in FIG. 5, the present invention performs an operation as shown in FIG. 6. The operation as shown in FIG. 6 is similar to the operation as shown in FIG. 3 except that no URL database 13 needs to be accessed.

More particularly, as shown in FIG. 6, in a first step S60 the computer 1 queries the peripheral device 2 for its identification data (ID) utilizing a driver in the local port 11, similarly as in step S30. The operation then proceeds to step S61 in which the computer 1 obtains not only the manufacture and model data from the peripheral device 2, but also the URL ADDRESS data 49 which has the device driver for the peripheral device 2. In such an operation of the present invention as shown in FIG. 6, since the computer 1 obtains the data for the URL address from the peripheral device 2, the computer does not need to access a URL database 13. The operation then proceeds to step S64 in which the browser is launched with the URL address obtained within the device identification data. The operation then proceeds to step S60 in which the device driver is downloaded and installed, similarly as in step S35.

Thus, the operation as shown in FIG. 6 is an operation which can be executed in the present invention as an alternative to the operation as shown in FIG. 3.

It should also be clear that the system of the present invention can include both operations as shown in FIGS. 3 and 6 so that the present invention does not require total reliance on either the URL database 13 or being provided with the URL address in the identification data from the peripheral device 2.

With such operations in the present invention, the computer user does not have to take actions to install the device driver for the peripheral device 2 in their computer 1, or at least only has to take minimum actions. Further, the manufacturer of the device driver 2 does not need to package any device driver software on a floppy disk or CD-ROM with the peripheral device 2. Such a system and operation in the present minimizes the chance that the computer makes any errors in installing the device driver, and ensures that the most up-to-date device driver is installed in the computer 1. Further, the manufacturer of the peripheral device 2 can realize many cost savings and improve their product for the computer user.

The present invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMS, and magneto-optical disks, ROMS, RAMs, EPROMS, EEPROMS, magnetic or optical cards, or any type of media suitable for storing electronic instructions.

Obviously, numerous modifications and variations of the present invention are possible in light of the above teachings. It is therefore to be understood that within the scope of the appended claims, the present invention may be practiced otherwise than as specifically described herein.

What is claimed is:

1. A method of installing a device driver in a computer, the device driver driving a peripheral device connected to the computer, comprising the steps of:

(a) obtaining identification data of the peripheral device from the peripheral device;

(b) obtaining an URL address containing the device driver corresponding to the peripheral device based on the obtained identification data of the peripheral device, wherein said step (b) of obtaining the URL address includes the substep of (b1) accessing a previously generated database stored in the computer, the database storing URL addresses and a correspondence of peripheral device identification data to the stored URL addresses;

(c) accessing the obtained URL address; and (d) obtaining and installing in the computer the device driver corresponding to the peripheral device from the accessed URL address.

2. A method of installing a device driver according to claim 1, wherein the obtained identification data includes information of a manufacturer and model number of the peripheral device.

3. A method of installing a device driver according to claim 2, wherein the obtained identification data further includes information of a class, a description, and a compatible ID of the peripheral device.

4. A computer program product, comprising:
(a) a computer storage medium and (b) a computer program code mechanism embedded in the computer storage medium for causing a computer to control installing a device driver in the computer, the device driver driving a peripheral device connected to the computer, the computer program code mechanism (b) comprising:
- (b1) a first computer code device configured to obtain identification data of the peripheral device from the peripheral device;
- (b2) a second computer code device configured to obtain an URL address containing the device driver corresponding to the peripheral device based on the obtained identification data of the peripheral device, wherein the second computer code device (b2) obtains the URL address by accessing a previously generated database stored in the computer, the database storing URL addresses and a correspondence of peripheral device identification data to the stored URL addresses;
- (b3) a third computer code device configured to access the obtained URL address; and
- (b4) a fourth computer code device configured to obtain and install in the computer the device driver corresponding to the peripheral device from the accessed URL address.

5. A computer program product according to claim 4, wherein the obtained identification data includes information of a manufacturer and model number of the peripheral device.

6. A computer program product according to claim 5, wherein the obtained identification data further includes information of a class, a description, and a compatible ID of the peripheral device.

7. A computer system, comprising:
(a) a peripheral device connected to a computer;
(b) a device driver configured to drive said peripheral device;
(c) means for obtaining identification data of said peripheral device from said peripheral device;
(d) means for obtaining an URL address containing said device driver corresponding to said peripheral device based on the obtained identification data of said peripheral device, wherein said means (d) for obtaining the URL address includes (d1) a database stored in the computer, the database storing URL addresses and a correspondence of peripheral device identification data to the stored URL addresses;
(e) means for accessing the obtained URL address; an
(f) means for obtaining and installing in the computer said device driver corresponding to said peripheral device from the accessed URL address.

8. A computer system according to claim 7, wherein the obtained identification data includes information of a manufacturer and model number of said peripheral device.

9. A computer system according to claim 8, wherein the obtained identification data further includes information of a class, a description, and a compatible ID of said peripheral device.

* * * * *